United States Patent Office 3,038,853
Patented June 12, 1962

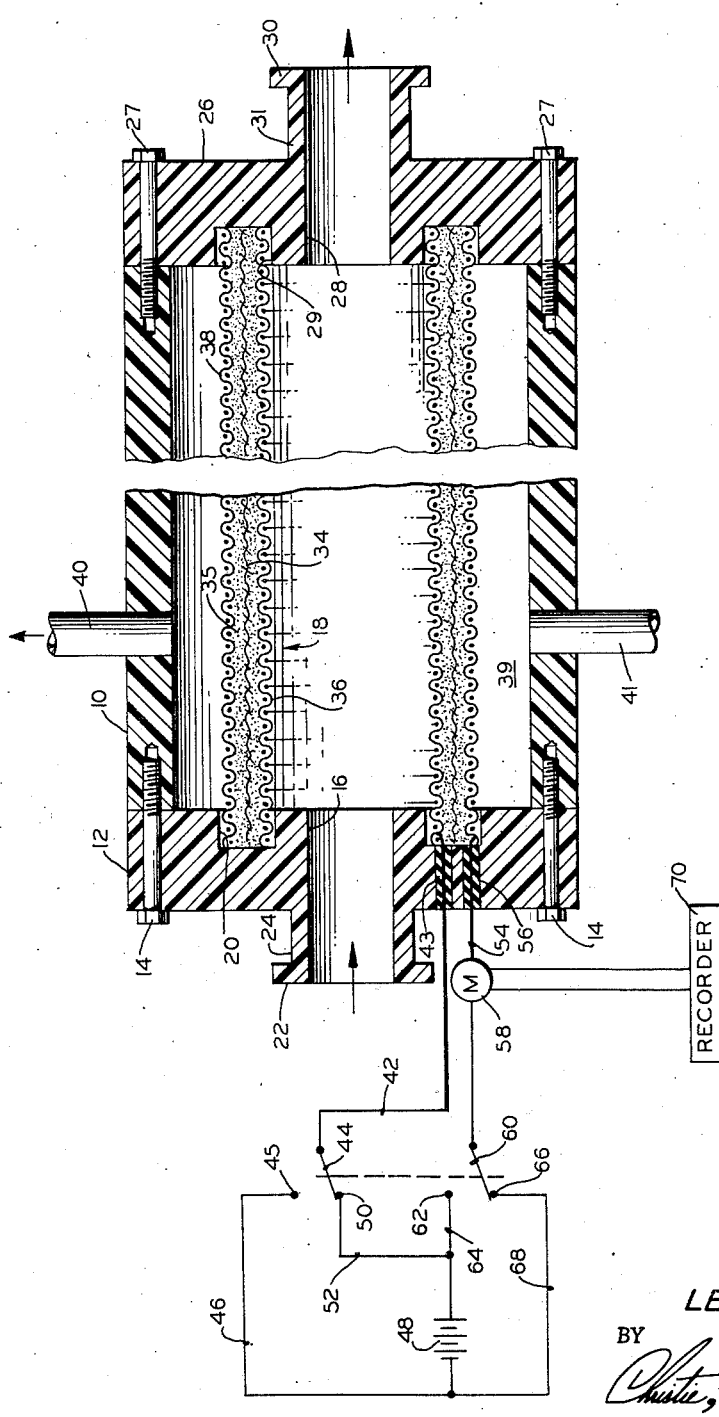
INVENTOR.
LELAND G. COLE
BY
ATTORNEYS

3,038,853
APPARATUS FOR REMOVING FROM A FLUID A MATERIAL SUSCEPTIBLE TO ELECTROLYTIC DECOMPOSITION
Leland G. Cole, Arcadia, Calif., assignor, by mesne assignments, to Consolidated Electrodynamics Corporation, Pasadena, Calif., a corporation of California
Filed May 11, 1959, Ser. No. 812,498
4 Claims. (Cl. 204—265)

This invention relates to apparatus for continuous removal of a material from a fluid by sorbing the material in a sorption medium and subjecting the sorbed material to electrolysis to effect the separation of the electrolytic decomposition products from each other.

Numerous processes have been used in the past for the continuous removal of materials from fluids by absorptive and adsorptive processes. Many of these prior processes require the simultaneous operation of dual or multiple absorption or adsorption columns to effect the regeneration of the one or more units while another unit or other units is used for the initial sorption. Other prior procedures have the disadvantage of either contaminating the fluid with electrolysis decomposition products, or else requiring complex mechanical devices, such as moving belts and locks or dynamic seals, for continuous transport of the sorption medium from contact with the fluid to an external reaction zone where the sorption material is reregenerated, and for the subsequent return of the regenerated sorption medium by mechanical means.

My copending application Serial No. 676,117, filed August 5, 1957, now abandoned, describes and claims methods and apparatus for separately recovering the decomposition products of a material sorbed from a fluid and electrolytically decomposed. The process of my copending application works satisfactorily, but recovering both products separately from the fluid often gives rise to design complications which are not necessary when only one of the decomposition products need be removed from the fluid.

This invention provides simplified apparatus for the removal of a material from a fluid by sorption in a suitable medium and subsequent electrolytic decomposition of the material in such a manner that one of the decomposition products is removed simultaneously from the fluid, the other decomposition product remaining in the fluid. Thus, one of the decomposition products is prevented from contaminating the fluid, transport of the sorption medium from the fluid is not required, and the sorption medium is continuously regenerated.

Briefly, the invention contemplates a conduit which is adapted to hold fluid containing the material to be removed from it. The conduit includes a sorption membrane or matrix having an inner surface exposed to the conduit interior and an outer surface exposed to the conduit exterior. The sorption membrane has the characteristic of sorbing the material from the fluid. A first electrode is in contact with the matrix at its inner surface, and a second electrode is in contact with the membrane at its outer surface. Means are provided for establishing an electric field between the two electrodes so that material sorbed by the matrix is electrolytically decomposed and the decomposition products are released on opposite sides of the membrane or conduit.

In the preferred form of the invention, the electrode on the side of the conduit opposite from the fluid is surrounded by an envelope to collect the decomposition product released on that side.

The terms "sorb" and "sorption" are used in the usual sense of pertaining to the phenomena of absorption or adsorption of materials by a suitable medium. Sorption media having the required characteristics are referred to as deliquescent materials.

The invention will be more fully understood from the following detailed description taken in conjunction with the accompanying drawing which is a schematic sectional of the presently preferred embodiment of the invention.

Referring to the drawing, a cylindrical envelope 10 is closed at its left end as viewed in the drawing by a first annular plate 12 secured by screws 14 to the envelope. The first plate includes a central inlet opening 16 through it to admit a fluid (not shown) to the interior of a hollow cylindrical sorption matrix or membrane 18 having its left end disposed in an annular groove 20 in the inside surface of the first plate around the inlet opening. An outwardly extending flange 22 on the left end of a longitudinally extending pipe section 24 formed integrally with the first plate around the inlet opening is adapted to be connected to a source (not shown) of the fluid containing a material which is to be removed by sorption and electrolytic decomposition.

A second annular plate 26 is secured by screws 27 to the outlet or right end of the envelope 10. The second plate includes an outlet opening 28 in its central portion and an annular groove 29 on its inner surface of the second plate around the outlet opening to receive the right end of the sorption matrix. An outwardly extending flange 30 on the right end of a longitudinally extending pipe section 31 formed integrally with the second plate around the outlet opening is adapted to be connected to a line (not shown) carrying the fluid to a desired point of storage or further treatment.

The sorption matrix can assume any suitable form, but preferably it is made up of a tubular sleeve 34 of a porous and insulating material such as cloth or glass fibre. The insulating sleeve or core is embedded in a cylindrical and hollow body of suitable sorption material 35. Thus the inner and outer surfaces of the matrix are constituted by continuous solid layers of deliquescent material. A first electrode 36, in the form of a cylindrical screen is disposed against the inner surface of the sorption material. The innermost portion of the screen is not covered by the sorption material so that bare portions of the first electrode are exposed to the fluid passing through the conduit. A second electrode 38 in the form of a cylindrical screen is concentrically disposed around the first screen and sorption material to be in contact with the outer surface of the sorption material. The outermost part of the second electrode is not covered by sorption material so that bare portions of the second electrode are in direct contact with the annular space lying between the outer surface of the conduit and the inner surface of the envelope 10. A product removal line 40 opens into the annular space for the removal of one of the decomposition products. An alternate fluid inlet line 41 opens into the annular space for a purpose described in detail below.

One end of a first electrical lead 42 is connected to the left end of the inner electrode. The lead 42 passes through a first sealing bushing 43 in the first place and is adapted to be connected through a first switch 44 to either a first contact 45 which is connected by a lead 46 to the negative terminal of a battery 48, or to a second contact 50 which is connected by a lead 52 to the positive terminal of the battery. One end of a second electrical lead 54 is connected to the left end of the second or outer electrode and extends through a second sealing bushing 56 in the first plate, and is connected to an ammeter 58 which in turn is adapted to be connected through a second switch 60 to either a third contact 62 connected to the positive terminal of the battery by lead 64, or to a fourth contact 66 connected by lead 68 to the negative terminal of the battery. A recorder 70 is connected to the ammeter for recording the amount of decomposition current flowing through the circuit.

Numerous sorption materials are available for use in accordance with this invention, depending on the nature of the fluid and the material to be removed. Electrolytic properties of the sorption material should be unaffected by all substances in the fluid, and preferably the sorption material is capable of removing the desired material quantitatively from the fluid. In a preferred form of the invention, the sorption material is non-conducting when all, or substantially all, of the sorbed material has been decomposed electrolytically.

To consider a specific example, the anhydride of phosphoric acid (phosphorus pentoxide) is a satisfactory sorption medium for removing water from fluid stream such as air, buffering atmospheres, furnace atmospheres, petroleum and chemical plant streams, chlorine, sulphur dioxide, ethylene, ethyl chloride, or other halogen-substituted hydrocarbons such as the "Freons."

One convenient way for preparing the sorption membrane when phosphoric acid ($H_3PO_4$) is used, is to dip the tubular insulating core, which may be made of porous glass fiber cloth, in phosphoric acid. The core is then removed from the acid and dried to form an anhydrous phosphoric acid coating on the screen. If a fluid-impermeable membrane is not formed with the first dipping and drying operation, the cycle is repeated as many times as necessary to build up a phosphorus pentoxide-phosphoric acid membrane capable of retaining the fluid which is placed in contact with it. The electrode screens are then placed in the position shown in the drawing, and bonded to the sorption material by painting, spraying, or otherwise coating with additional phosphoric acid solution. The membrane is then inserted in the position shown in the drawing, the electrical leads being previously connected to their respective electrodes and let through their respective bushings.

Preferably, the apparatus is first operated without putting a fluid stream throught it for sufficient time to dry the membrane thoroughly and thus bring it to a hygroscopic level capable of absorbing water from the fluid stream to be dried. This condition is indicated by the failure of the membrane to conduct appreciable electrical current, and the membrane now has strong hygroscopic properties. For example, at 25° C. the equilibrium value of water vapor in contact with anhydrous phosphoric acid is less than $2 \times 10^{-5}$ mm. Hg.

Other examples of suitable hygroscopic materials which can be used according to this invention for water removal are sodium oxide (dried NaOH), or potassium oxide (dried KOH), which conveniently may be used where acid conditions are objectionable but basic conditions can be tolerated.

The electrodes can be of any suitable materials which are inert to the sorption medium or material and the electrolytic decomposition products. For example, in removing water with anhydrous phosphoric acid, the anode is platinum screen made of wire about 1 mil in diameter, and the cathode is stainless steel screen made of wire about 1 mil in diameter. The spacing between, and voltage across, the electrodes can vary widely, but a spacing of about 1 mil and a voltage of 40 volts provide satisfactory operation at about 30° C. and near atmospheric pressure. When the apparatus is to be used as shown in the drawing so that either one of the electrodes may serve as either a cathode or anode, preferably both electrodes are platinum screen.

In operating the apparatus to remove water from a fluid, say a stream of humid air, the air is passed through the conduit as indicated by the arrows in FIG. 1, and the switches 42 and 60 are set in the position shown so that the interior electrode is the anode, and the exterior electrode is the cathode. Water is absorbed from the air by the hygroscopic material, and migrates to the central portion of the sorption material where it is subjected to the electric field established between the anode and the cathode. The thickness of the membrane is sufficiently small to provide for low transit times for the migrating water. Water in the sorption material undergoes ionization. The oxygen carrying ions are attracted to the inner electrode (the anode), and the hydrogen ions are attracted to the outer electrode (cathode). The oxygen carrying ions, on reaching the cathode, give up electrons to release neutral oxygen atoms, which then combine to form oxygen molecules. The oxygen gas is evolved from the interior surface of the conduit or sorption material, and re-enters the air stream passing through the apparatus. The hydrogen ions, on reaching the cathode take up electrons to become neutral hydrogen atoms which then combine to form hydrogen molecules so that hydrogen gas is released from the exterior surface of the conduit or sorption matrix. The hydrogen gas is collected in the annular space between the sorption matrix and the envelope, and may be drawn off through the product removal pipe 40 for storage or use.

Thus, the sorption material is continuously regenerated in place, and the cathodic decomposition product (hydrogen) is prevented from contaminating the fluid stream flowing through the apparatus. This is an important advantage in water removal from fluids used in systems which cannot tolerate a strong reducing agent. Moreover, under some conditions the production of hydrogen can dangerously approach the lower explosive limit, which produces a hazard for both personnel and equipment.

If it is desired to remove the anodic decomposition product (oxygen) from the fluid stream instead of the cathodic decomposition product, the switches 42 and 60 are thrown so that they are respectively connected to contacts 44 and 62, reversing the polarity of the electrodes. Operating under this condition, the hydrogen is left in the fluid stream, and the oxygen is removed from it. This is advantageous in systems which cannot tolerate the presence of a strong oxidizing agent such as oxygen in the fluid stream.

The invention can also be practiced by modifying the apparatus of the drawing to use lines 41 and 42 as a fluid outlet and inlet, respectively, in the annular space 39. In this modified arrangement, the fluid is disposed in the annular space and the decomposition product to be removed separately from it is removed from the interior of the membrane. However, with either arrangement and for the purpose of defining this invention, the term "inner" when applied to a surface means a surface in contact with the fluid, and the term "outer" when applied to a surface means a surface in contact with the electrolytic decomposition product being removed from the fluid.

Under some conditions it may be desirable to have two different fluids under treatment simultaneously on opposite sides of the sorption membrane, with one decomposition product from the first fluid being discharged into the second fluid and another decomposition product from the second fluid being discharged into the first. For example, in drying separate streams of hydrogen and oxygen, the switches are set as shown in the drawing to make the outer electrode the cathode and the inner electrode the anode. The oxygen stream is passed through the interior of the sorption matrix, and the hydrogen stream through the annular space surrounding the matrix. Water is sorbed from both streams and decomposed. Hydrogen is discharged into the hydrogen stream, and oxygen is discharged into the oxygen stream.

The importance of the invention can be appreciated from considering its application to the dehumidification of air. The removal of each part per million of water from $10^6$ cubic feet of air requires about .2 kw.-hr. which, at a typical industrial rate of 9 mills per kw.-hr., amounts to only $1.80 per million cubic feet of initially 1000 p.p.m. gas dried to less than 10 p.p.m. Further economic advantages brought about by the continuous, non-contaminating features of this invention are the elimination of cycling, regeneration, and recycling equipment from the initial investment, and by the attendant reduction in operating and maintenance costs from the elimination of the recycling and regeneration labor.

Moreover, for some dehumidification applications, the complete removal of water is not only unnecessary but undesirable. For example, an optimum relative humidity for human comfort is generally considered to be between 40% and 60% at 75° F. Therefore, the efficiency of commercial units employing this invention for the home, office, etc., does not have to be high. In addition, if the dehumidification apparatus of this invention is used in conjunction with a gas-heated, gas absorption refrigeration system, operating costs are further reduced by collecting and burning the hydrogen to reduce the natural gas supply needed to run the refrigeration system. For example, the variability in natural gas supply needed (as humidity of processed air increases or decreases) is controlled by a bimetallic controlled valve operative in response to the flame temperature of the gas pilot of the refrigeration system, decreasing the ratio of natural gas to hydrogen as flame temperature of the gas pilot rises due to increasing hydrogen concentrations, and increasing the ratio of gas to hydrogen as humidity decreases.

I claim:
1. Apparatus for removing from a fluid a material susceptible to electrolytic decomposition, the apparatus comprising a conduit adapted to hold the fluid, the conduit including a sorption electrolyte matrix having an inner surface exposed to the conduit interior and an outer surface exposed to the conduit exterior, each surface of the matrix being a continuous solid layer of a deliquescent material having the characteristics of sorbing the material from the fluid and being electrically conductive in the presence of the sorbed material, a first electrode in contact with the matrix at its inner surface, a second electrode in contact with the matrix at its outer surface, means for flowing the fluid in contact with one surface of the matrix, and means for providing a direct current potential across the electrodes so that material sorbed by the matrix is electrolytically decomposed, and so the cathodic product of the decomposition is drawn to one electrode and released from the adjacent surface of the matrix and the anodic product of the decomposition is drawn to the other electrode and released from the other surface of the matrix.

2. Apparatus according to claim 1 in which the deliquescent material is selected from the group consisting of dried $H_3PO_4$, $NaOH$, and $KOH$.

3. Apparatus for removing from a fluid a material susceptible to electrolytic decomposition, the apparatus comprising a conduit adapted to hold the fluid, the conduit including a sorption electrolyte matrix having an inner surface exposed to the conduit interior and an outer surface exposed to the conduit exterior, each surface of the matrix being a continuous solid layer of a deliquescent material having the characteristics of sorbing the material from the fluid and being electrically conductive in the presence of the sorbed material, a first electrode in contact with the matrix at its inner surface, a second electrode in contact with the matrix at its outer surface, means for flowing the fluid in contact with one surface of the matrix, means for providing a direct current potential across the electrodes so that material sorbed by the matrix is electrolytically decomposed, and so the cathodic product of the decomposition is drawn to one electrode and released from the adjacent surface of the matrix and the anodic product of the decomposition is drawn to the other electrode and released from the other surface of the matrix, and an envelope enclosing the second electrode for collecting the decomposition products released at the second electrode.

4. Apparatus for removing from a fluid a material susceptible to electrolytic decomposition, the apparatus comprising a conduit adapted to hold the fluid, the conduit including a sorption electrolyte matrix having an inner surface exposed to the conduit interior and an outer surface exposed to the conduit exterior, each surface of the matrix being a continuous solid layer of a deliquescent material having the characteristics of sorbing the material from the fluid and being electrically conductive in the presence of the sorbed material, a first electrode in contact with the matrix at its inner surface, a second electrode in contact with the matrix at its outer surface, means for flowing the fluid in contact with one surface of the matrix, means for providing a direct current potential across the electrodes so that material sorbed by the matrix is electrolytically decomposed, and so the cathodic product of the decomposition is drawn to one electrode and released from the adjacent surface of the matrix and the anodic product of the decomposition is drawn to the other electrode and released from the other surface of the matrix, and means for reversing the polarity of the electrodes.

References Cited in the file of this patent

UNITED STATES PATENTS

| | | |
|---|---|---|
| 1,740,659 | MacDonald | Dec. 24, 1929 |
| 1,885,393 | Van Schaack | Nov. 1, 1932 |
| 1,913,702 | D'Adrian | June 13, 1933 |
| 2,816,067 | Keidel | Dec. 10, 1957 |